United States Patent [19]

Dougal, Jr. et al.

[11] Patent Number: 5,017,647

[45] Date of Patent: May 21, 1991

[54] BLACK-PIGMENTED POLYMERIC COMPOSITIONS OF MATTER

[75] Inventors: Alvin L. Dougal, Jr., Milwaukee, Wis.; Shigeyoshi Hara, Iwakuni, Japan

[73] Assignee: Hercules Incorporated, Wilmington, Del.

[21] Appl. No.: 534,344

[22] Filed: Jun. 5, 1990

Related U.S. Application Data

[63] Continuation-in-part of Ser. No. 283,118, Dec. 12, 1988, abandoned, which is a continuation-in-part of Ser. No. 151,745, Feb. 3, 1988, abandoned, which is a continuation-in-part of Ser. No. 224,631, Jul. 27, 1988, abandoned.

[51] Int. Cl.$^5$ .............................................. C08K 3/04
[52] U.S. Cl. ........................... 524/856; 524/553; 524/554; 524/855
[58] Field of Search .............. 524/553, 554, 855, 856

[56] References Cited

U.S. PATENT DOCUMENTS

| | | |
|---|---|---|
| 3,329,650 | 7/1967 | Albin et al. . |
| 3,514,426 | 5/1970 | Barrett . |
| 4,379,867 | 4/1983 | Noriaki . |
| 4,703,098 | 10/1987 | Matlack . |

FOREIGN PATENT DOCUMENTS 749448 12/1966 Canada .

*Primary Examiner*—John C. Bleutge
*Assistant Examiner*—David W. Woodward
*Attorney, Agent, or Firm*—Mark Goldberg

[57] ABSTRACT

A pigmented polymeric composition of matter is provided which comprises units derived from ring-opening metathesis catalyst polymerization of a norbornene-type monomer or mixtures of norbornene-type monomers, and from about 0.05 to about 25 parts by weight, per 100 parts norbornene-type monomer, of carbon black which is substantially free of oxygen.

2 Claims, 3 Drawing Sheets

BLACK-PIGMENTED POLYMERIC COMPOSITIONS OF MATTER

This application is a continuation-in-part of application Ser. No. 07/283,118, which is a continuation-in-part of U.S. patent application Ser. No. 07/151,745 filed Feb. 3, 1988, now abandoned and U.S. patent application Ser. No. 07/224,631 filed July 27, 1988, now abandoned; said Ser. No. 07/224,631 also being a CIP of Ser. No. 07/151,745.

Norbornene-type monomers such as dicyclopentadiene, tricyclopentadiene and higher oligomers of dicyclopentadiene, norbornene, norbornadiene, tetracyclododecene and tetracyclododecadiene are known to undergo ring-opening polymerization reactions in the presence of a metathesis catalyst to form high modulus, high-impact strength polymers, or copolymers and terpolymers from mixtures of such monomers. For example, U.S. Pat. No. 4,400,340 describes the preparation of poly(dicyclopentadiene) from metathesis catalyst ring-opening polymerization of dicyclopentadiene. Similarly, U.S. Pat. Nos. 4,568,660; 4,689,380; 4,703,098 and 4,701,510 describe metathesis catalyzed copolymerization and terpolymerization of various norbornene-type monomers.

Most polymeric materials prepared as such as painted for aesthetic reasons. It would be desirable to produce pigmented material which would not require painting. It is also believed the production of black-pigmented material would provide polymers with improved ultraviolet stability as such black-pigmented material would act as black bodies thereby absorbing and dispersing most impinging polymer-degradative radiation.

Accordingly, the present invention provides a pigmented polymeric composition of matter comprising units derived from ring-opening metathesis catalyst polymerization of a norbornene-type monomer or mixtures of norbornene-type monomers, preferably from about 0.5 parts to about 25 parts by weight and most preferably from about 0.05 to about 25 parts by weight, per 100 parts norbornene-type monomer, of carbon black which is substantially free of oxygen.

Any of the various ring-opening metathesis catalyst polymerizable norbornene-type monomers known in the art are useful in the instant invention. For example, such monomers include dicyclopentadienes, tricyclopentadienes and higher oligomers of dicyclopentadiene, norbornenes, norbornadienes, tetracyclododecenes and tetracyclododecadienes. In accordance with this invention, such norbornene-type monomers or mixtures thereof can undergo ring-opening metathesis catalyst polymerization in the presence of carbon black to form black pigmented polymers, copolymers and terpolymers comprising units derived from such monomers. Ring-opening metathesis catalyst polymerization of such monomers for purposes of this invention can be conducted by a variety of procedures and catalyst systems known in the art. A preferred method is taught, for example, in U.S. Pat. No. 4,400,340. In such a process known as reaction injection molding (RIM), a plurality of component-reactive liquid streams, usually two or three streams, comprising a two-part metathesis catalyst system are mixed together and the combined streams then injected into a mold where they quickly set up into a solid polymerized mass.

One of these streams contains a metathesis catalyst component, preferably a tungsten halide or tungsten oxyhalide complex dissolved in a norbornene-type monomer or mixture of such monomers. Another stream contains an alkylaluminum activator component, preferably comprising an alkylaluminum iodide compound, and a reaction rate moderator to delay catalyst activation which are also dissolved in norbornene-type monomer or mixtures thereof. The streams are mixed together and subsequently injected into a mold of the desired shape where the metathesis polymerization takes place. The reaction rate moderator delays the onset of the reaction for the time required to transfer the entire mixture into the mold, following which reaction is substantially completed within about one-half minute or less.

Other additives known to improve impact strength or other properties of polymers comprising repeating units derived from norbornene-type monomers, or copolymers and terpolymers comprising repeating units derived from mixtures of such monomers can be incorporated into the polymers of the present invention. For example, a hydrocarbon elastomer such as butyl rubber, polyisoprene, polybutadiene, polyisobutylene, styrene-butadiene block and random rubbers, ethylene-propylene copolymers and ethylene-propylene-diene terpolymers and the like can be formulated with the norbornene-type monomer mixtures used in the reactive streams prior to polymerization.

BRIEF DESCRIPTION OF THE FIGURES

In FIGS. 1 and 2 the filled in square represent Shawinigan acetylene black (Chevron Chemical Company), the filled in circle represents Vulcan 9A 32 furnace black (Cabot Corporation) and the open circle represents control with no carbon black. The X-axis is hours and the Y-axis $T_{100}$ (seconds).

FIG. 3 shows catalyst component stability for Asahi Thermal (FT) (Asahi Carbon).

FIG. 4 shows catalyst component stability for Denka Black (acetylene black) (Denki Kagaku).

FIG. 5 shows catalyst component stability for SEVACARB MT-CI (MT) (Columbian Carbon).

In FIGS. 3-5 carbon black is added at 2.5 wt. %. The filled-in circle represents the control with no carbon added. The open circle represents carbon added to component A. The triangle represents carbon added to component B. The X represents carbon added to both components A and B. The X-axis is time elapsed in days and the Y-axis $T_{100}$ (seconds).

Figure 1:
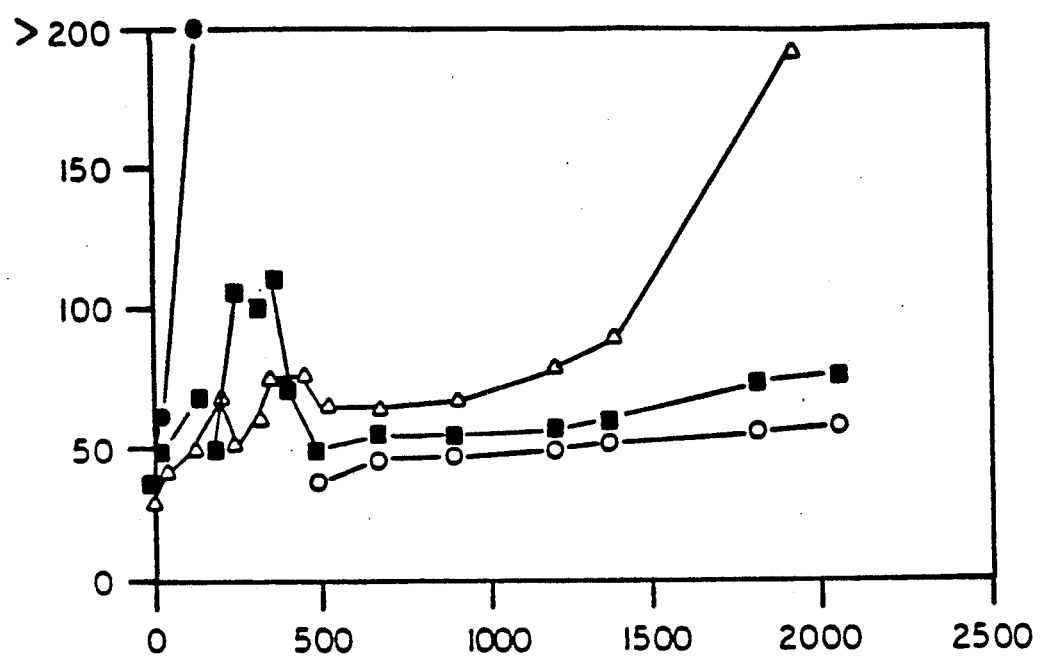
FIG. 1 shows B component stability study with 1.3% carbon black.

In accordance with the present invention, substantially oxygen-free carbon black can be admixed with any of the several component-reactive streams, such as the metathesis catalyst component-monomer mixture stream or activator component-monomer mixture stream, which comprise the metathesis catalyst system to form suspensions thereof at any point prior to their mixture and subsequent monomer polymerization.

The term "carbon black" as used herein is a generic term referring to a family of industrial carbon-containing products which are essentially elemental carbon. In general, carbon black is manufactured from liquid or gaseous hydrocarbons by partial or incomplete combustion processes involving flames, examples of which include lamp blacks, channel blacks and furnace blacks, or by thermal decomposition processes in the absence of air or flames. Examples of carbon blacks from thermal decomposition processes include thermal carbon blacks, made by endothermic decompostion, and acetylene blacks, made by exothermic decomposition.

Most carbon blacks produced via partial combustion processes contain significant amounts of chemically combined surface oxygen and other chemisorbed oxygen compounds in addition to varying amounts of moisture, sulfur and inorganic salts. Oxygenated impurities, moisture and inorganic salts which have been absorbed or absorbed on the carbon black surface can have deleterious effects on the reactivity of metathesis catalyst systems by causing a sharp loss in metathesis catalyst system component shelf-life stability when formulated therein. This is evidenced by severely depressed polymerization reaction rates when the metathesis catalyst system components are mixed together. Further, the presence of such oxygenated compounds and inorganic salts results in dramatically increased surface activity and hygroscopicity thereby rendering carbon blacks produced via partial combustion methods essentially non-dispersible or highly resistant to dispersion in the highly hydrophobic catalyst system component-monomer mixtures used in metathesis polymerization systems contemplated herein.

Carbon blacks containing oxygenated impurities can be freed of such impurities and rendered useful as fillers or pigments in metathesis polymerization systems via a heat treatment at about 250° to 500° C. for about 4 to 7 hours in absence of oxygen. Oxygenated impurities can also be removed by washing such carbon blacks with an aluminum alkyl compound of the type employed as catalyst activator in metathesis polymerization.

In thermal decomposition processes, carbon blacks are formed with the generation of hydrogen in the absence of air or oxygen. Carbon blacks thus formed contain far less oxygenated polar contaminants than do carbon blacks formed from partial combustion processes, and are correspondingly more highly carbonized with far less tendency to absorb moisture and need not be subjected to any heat treatment or washing steps. Typically such carbon blacks contain less than about 0.3% oxygen, and correspondingly contain 99% or more elemental carbon when formed. Oxygen-devoid carbon blacks have been found not to affect metathesis catalyst system component shelf-life stability and corresponding metathesis catalyst system activity adversely. Component reactive streams comprising the metathesis catalyst system having such carbon blacks dispersed therein, in accordance with this invention, can, therefore, be prepared and stored for extended periods of time prior to component mixing and subsequent polymerization in contrast to such component streams prepared with carbon blacks containing absorbed oxygen which can rapidly destabilize within a very short time period and exhibit unacceptable polymerization reactivity upon mixing. Further, apparently due to their highly carbonized nature, low surface activity and moisture content, oxygen-free carbon blacks are unexpectedly easily dispersed in the non-polymerized catalyst system component-monomer mixtures. Such easily dispersed pigments do not, therefore, require the use of special high shear mixing devices such as ultrasonic mixing devices and the like which are needed to disperse carbon black containing absorbed oxygen.

Any of the various grades and industry types of thermal and acetylene carbon blacks from thermal decomposition processes are preferred for use herein as these can be used without any post-preparation heat treatment or washing. These include ASTM classifications N880 FT-FF (fine thermal black, free flowing), N881 FT (fine thermal black), N990 MT-FF (medium thermal black, free flowing), N907 MT-NS-FF (medium thermal black, nonstaining, free flowing), N908 MT-NS (medium thermal black, nonstaining) and N991 MT (medium thermal black), and Shawinigan acetylene carbon black available from the Chevron Chemical Company. The different grades of such carbon blacks can be distinguished by their different physical properties such as average particle diameter, surface area, pH, amount of volatile or residual hydrocarbon contained therein, and material composition including percent carbon, hydrogen, sulfur and oxygen, which can affect surface activity and moisture adsorption. Factors other than material composition generally are not critical in any way to the selection of carbon blacks useful in this invention. However, for ease of dispersion in norbornene-type monomer containing component reactive streams, grades of carbon blacks from thermal decomposition processes which are more highly carbonized than other grades and correspondingly are of lower surface activity and moisture adsorption are especially preferred in this invention. Examples of such grades include Shawinigan acetylene carbon black available from Chevron Chemical Company which is among the purest forms of carbon blacks manufactured from thermal decomposition methods, and having a carbon content of 99.7% or higher and possessing very low surface activity and moisture adsorption.

The method and order of addition of the oxygen-free carbon black to the monomer containing component-reactive streams comprising the metathesis catalyst system prior to mixing thereof and polymerization is not critical to the instant invention. Said carbon blacks can be added to any or all of the several component reactive streams and easily dispersed therein simply by agitation or by mixing with ordinary mixing devices. If desired, the carbon black can first be dispersed in a hydrocarbon elastomer which is then incorporated into the metathesis catalyst component-monomer reactive stream, or any other reactive stream as desired.

In accordance with this invention, the amount of carbon black employed can vary from preferably about 0.5 to about 25 parts by weight and most preferably from about 0.05 to about 25 parts by weight per 100 parts norbornene-type monomer, or mixtures of such monomers in the catalyst system as a whole. The amount of carbon black employed can depend on such factors as the extend of pigmentation desired in polymerized products and the particle size of particular carbon blacks employed which can affect the viscosity of monomer containing reactive streams when formulated therein.

The following examples more fully illustrate preferred embodiments of the instant invention.

EXAMPLE 1

The following example illustrates the unexpected superior compatibility of carbon blacks manufactured by thermal decomposition processes with metathesis catalyst systems relative to carbon blacks prepared from partial combustion methods.

Catalyst component stability tests are performed using a two-part metathesis catalyst system in the ring-opening polymerization of dicyclopentadiene monomer. A metathesis catalyst activator component-monomer reactive stream (A) is prepared by adding 20 ml of dioctyl aluminum iodide (0.222M) to 200 ml of dicyclopentadiene. A metathesis catalyst component-monomer reactive stream is prepared by adding 20 ml of 0.074 molar tungsten hexachloride-tungsten oxytetrachloride complex solution (in toluene) to 200 ml of dicyclopentadiene. Preparation of both mixtures was carried out in nitrogen sparged bottles.

To determine compatibility of the carbon black with the reactive components, 5.2 grams (2.6 wt. %) of the blacks were dispersed in separate 200 ml aliquots A and B component streams. These were then allowed to sit for varying periods of time at room temperature. Periodically, an aliquot of the component containing carbon black is mixed with an aliquot of activator component containing no carbon black at 32° C. and allowed to polymerize. At the same time an aliquot of the activator component containing carbon black is mixed with an aliquot of catalyst component containing no carbon black at 32° C. and allowed to polymerize. Each time a control is run wherein no carbon black is present in either component. In all cases, the formulation levels in the mixture of components is 1000/0.5/1.5 mole ratio of dicyclopentadiene/tungsten/aluminum and 1.3 wt. % of carbon black.

Figure 2:
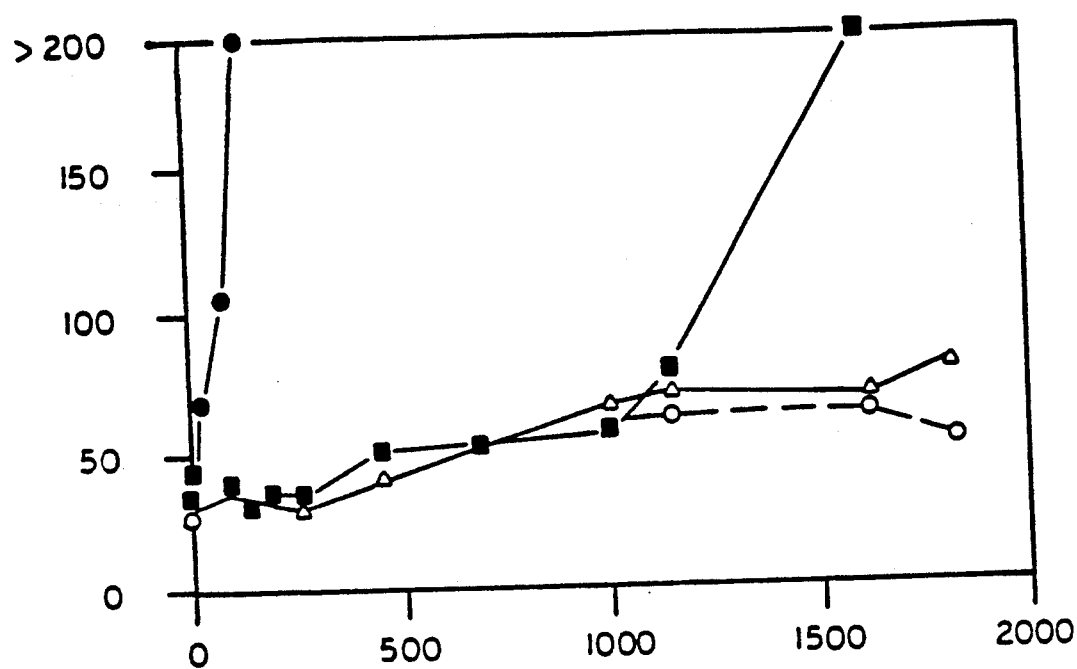
FIG. 2 shows A component stability study with 1.3% carbon black.

Each polymerization vessel wherein components A and B are mixed is fitted with a thermocouple, and the time is determined for the temperature of the ensuing metathesis catalyzed exothermic polymerization reaction to go from approximately 32° C. at the point of mixture ($t_0$) to 100° C. ($T_{100}$). The results of this testing are illustrated in FIGS. 1 and 2 where $T_{100}$ (the y-axis) is plotted against hours of aging. In FIGS. 1 and 2 the squares represent Shawinigan acetylene black (Chevron Chemical Company, the solid circles represent Vulcan 9A 32 furnace black (Cabot Corporation) and the outlined circle represents the control. FIG. 1 is a stability study of Component B and FIG. 2 is a stability study of Component A. The extremely long $T_{100}$ times exhibited by the non-heated furnace black indicates that that material is destructive of both catalyst and activator activity. By contrast, the $T_{100}$ time of either component remains low, similar to that of the control, for relatively long periods of time when formulated with blocks that are free of oxygen according to this invention.

EXAMPLE 2

Figure 3:
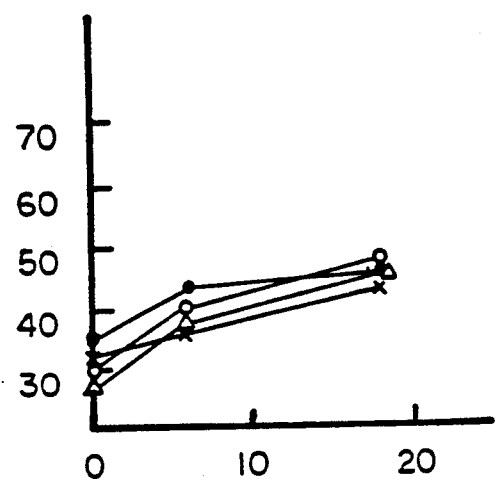
FIGS. 3-5 show catalyst component stability for three different types of carbon black.
Figure 4:
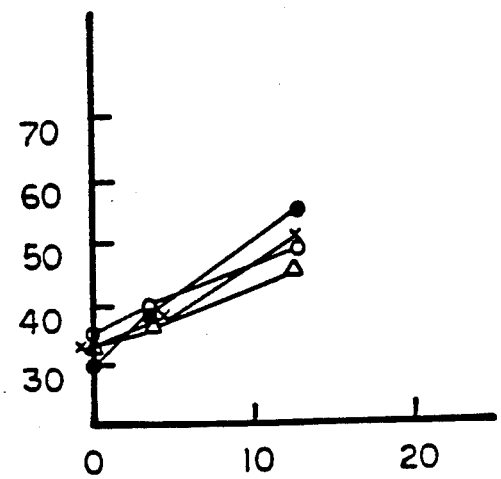
Figure 5:
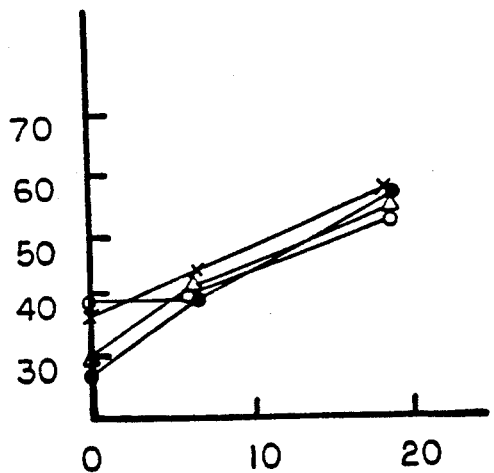

Additional catalyst component stability tests are performed using the procedure set out in Example 1, except that various types of carbon black at 2.5 wt. % from thermal decomposition processes are substituted for Shawinigan acetylene carbon black. The results are indicated FIGS. 3 to 5. In FIG. 3 the carbon black is Asahi Thermal (FT)(Asghi carbon), in FIG. 4 the carbon black is Denka Black (acetylene black)(Denki Kagaku) and in FIG. 5 the carbon black is SEVACARB MT-CI (MT)(Columbian carbon). In FIGS. 3 to 5, the solid circles represent the control, with no carbon in the A or in the B component. The outlined circles represent carbon in the A component, but not in the B component. The triangles represent carbon in the B component, but not in the A component. The X's represent carbon in both components.

EXAMPLE 3

Specimens of catalyst and activator component are prepared using the same molar ratios of dicyclopentadiene, tungsten and aluminum as are reported in Example 1. To the catalyst component is added 0.2, 0.4 and 2.5% by weight of Shawinigan thermal black, based on weight of dicyclopentadiene. This material, along with a control containing no carbon black, are polymerized by mixing it with the activator component and immediately injecting the mixture into a plaque mold. $T_{100}$ time is essentially the same for all samples.

Physical properly data for all specimens is reported in the following table.

| Carbon Black Content | 0% | 0.1% | 0.2% | 1.25% |
| --- | --- | --- | --- | --- |
| Heat Distortion Temp. | 101.5 | 96.2 | 96.5 | 99.8 |
| Tg (DMA) | 139 | 141 | 137 | 140 |
| Notched Izod 23° C. | 50.5 | 50.7 | 51.4 | 47 |
| Impact Strength 0° C. | 42.9 | 42.7 | 43.2 | 37 |
| Impact Strength 30° C. | 29.7 | 28.3 | 28.5 | 26 |
| Flex Modulus | 17.700 | 17.600 | 17.600 | 18.190 |
| Flex Strength | 718 | 680 | 677 | 699 |

From the above, it can be seen that physical properties are not materially affected by the presence of carbon black at the levels employed here.

I claim:

1. A process of polymerizing norbornene-type monomers or a mixture of norbornene-type monomers by a ring opening metathesis catalyst polymerization reaction, in the presence of carbon black prepared by thermal decomposition processes and which is substantially free of oxygen, said process comprising adding said carbon black to said monomers and polymerizing said monomers wherein said norbornene-type monomer is selected from the group consisting of dicyclopentadiene, trimers and higher oligomers of dicyclopentadiene, norbornene, norbornadiene, tetracyclododecenes and tetracyclododecadienes and mixtures thereof, and wherein the amount of carbon black is from about 0.05 parts to about 25 parts by weight per 100 parts norbornene-type monomer or mixture of such monomers.

2. The process of claim 1 wherein said norbornene-type monomer is dicyclopentadiene.

* * * * *

UNITED STATES PATENT AND TRADEMARK OFFICE
CERTIFICATE OF CORRECTION

PATENT NO. : 5,017,647

DATED : May 21, 1991

INVENTOR(S) : Alvin L. Dougal, Jr. and Shigeyoshi Hara

It is certified that error appears in the above-identified patent and that said Letters Patent is hereby corrected as shown below:

In col. 4, line 55 in place of the words "factors as the extend", should read --factors as the extent--.

In col. 5, line 57 in place of the words "indicated FIGS.", should read --indicated by FIGS.--.

In col. 6, line 1 in place of the words "(Asghi carbon)", should read --(Asghi Carbon)--.

In col. 6, line 4 in place of the words "(Columbian carbon)", should read --(Columbian Carbon)--.

In col. 6 line 24 in place of the words "Physical properly", should read --Physical property--.

Signed and Sealed this

Fifteenth Day of December, 1992

*Attest:*

DOUGLAS B. COMER

*Attesting Officer*  *Acting Commissioner of Patents and Trademarks*